United States Patent
Anders

[15] 3,685,751
[45] Aug. 22, 1972

[54] APPARATUS FOR GRANULATING THERMOPLASTIC MATERIALS

[72] Inventor: Dietmar Anders, Hannover, Germany

[73] Assignee: Berstorff, Hermann Maschinenbau GmbH, Hannover-Kleefeld, Germany

[22] Filed: Dec. 15, 1970

[21] Appl. No.: 98,352

[30] Foreign Application Priority Data
Dec. 23, 1969  Germany..........P 19 64 413.4

[52] U.S. Cl. ................................................241/256
[51] Int. Cl. ...............................................B02c 7/14
[58] Field of Search...241/46.04, 230, 231, 234, 256, 241/259

[56] References Cited
UNITED STATES PATENTS

| 1,686,217 | 10/1928 | Loman | 241/256 |
| 1,737,183 | 11/1929 | Brennan et al. | 241/256 |
| 2,456,883 | 12/1948 | Messinger et al. | 241/256 |

Primary Examiner—Granville Y. Custer, Jr.
Attorney—Mason, Mason & Albright

[57] ABSTRACT

A machine for granulating thermoplastics material includes a cutter head which rotates in a plane parallel to a nozzle plate through which material is extruded. The spacing between the head and plate is adjustable by an arrangement which includes a bush surrounding a spindle carrying the cutter head. An adjustable stop on the bush co-operates with a counter-stop on a differential screw device in order to adjust the spacing. The bush is biased to prevent backlash in the differential screw device.

9 Claims, 2 Drawing Figures

APPARATUS FOR GRANULATING THERMOPLASTIC MATERIALS

BACKGROUND OF THE INVENTION

1. Field of the invention.

This invention relates to a machine for granulating thermoplastics material.

2. Description of the prior art.

A machine for granulating thermoplastics material incorporating a cutter head by which the material is granulated as it is extruded from a nozzle plate has already been proposed. On the fixed machine frame a hand control is provided which is so mounted as to have freedom to rotate but not to move axially, the screwthread of which engages in a corresponding mating thread that is secured against rotation on the assembly made up of the cutter head, a drive spindle and a device for effecting rapid-action axial adjustment of the cutter head.

With such a machine, the essential fine adjustment to within one hundredth of a millimeter is not possible, because play in the thread of the adjusting device is also communicated to the cutter head. There is always some degree of play between the nozzle plate and the cutter head, which makes fine adjustment by a hundredth of a millimeter impossible. This difficulty cannot be resolved by the provision of locknuts; for if, for instance, the locknuts be tightened to a high torque value to reduce this play, further adjustment is hardly possible, since the hand control itself is made correspondingly tighter at the same time.

An object of the present invention is to provide fine adjustment, independent of play in the thread and capable of extremely fine control in a machine for granulating thermoplastics material.

SUMMARY OF THE INVENTION

According to the present invention, there is provided in a machine for granulating thermoplastics material comprising a cutter head, a nozzle plate spaced from the cutter head by a small adjustable clearance, means for extruding thermoplastics material through the nozzles of the nozzle plate, a spindle carrying the cutter head, and a bush surrounding at least a part of said spindle, the improvement comprising means defining a stop mounted on said bush, means defining a differential screw adjustment device, a counter-stop co-operating with the screw adjustment device and in abutting relationship with the said stop, and means acting continuously on the stop and counter-stop whereby any free-play in the threads of the differential screwthread adjustment device is eliminated.

The stop may be in the form of an eccentric that can be adjusted and locked.

The stop should preferably be rotatable about an axis at right angles to the spindle of the cutter head.

The counter-stop should be so mounted as to be capable of axial movement, but not of rotation.

A further possibility is for the screw of the differential adjusting device to be made in two parts, one part engaging in a fixed threaded bush and the other being in abutting relationship with the counter-stop.

BRIEF DESCRIPTION OF THE DRAWINGS

One example of a machine embodying the invention will now be described, by way of example, with reference to the accompanying diagrammatic drawings, in which.

DESCRIPTION OF THE PREFERRED EMBODIMENT

Figure 1:
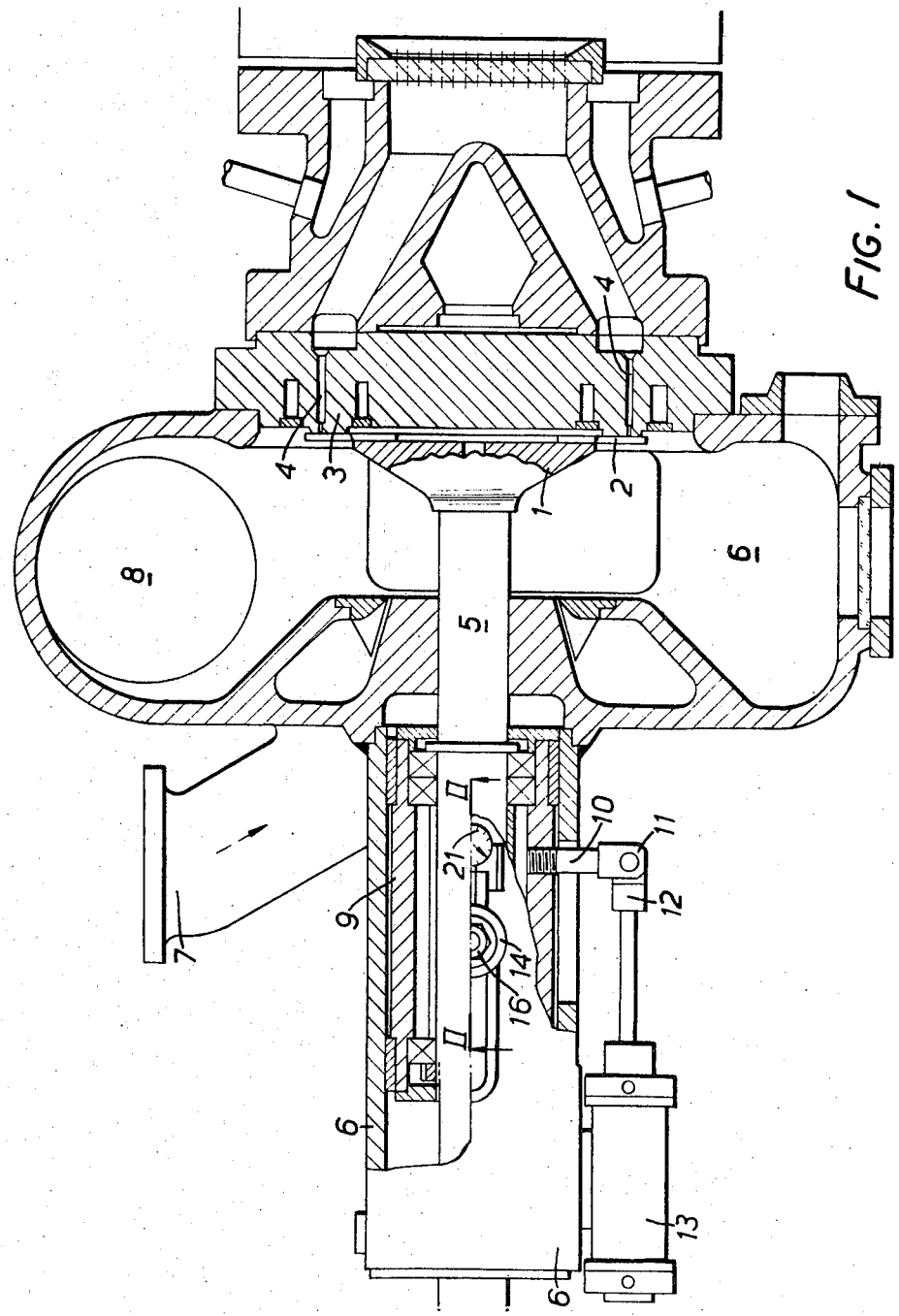
FIG. 1 is a side elevation, partly in section of a device in accordance with the invention.
Figure 2:
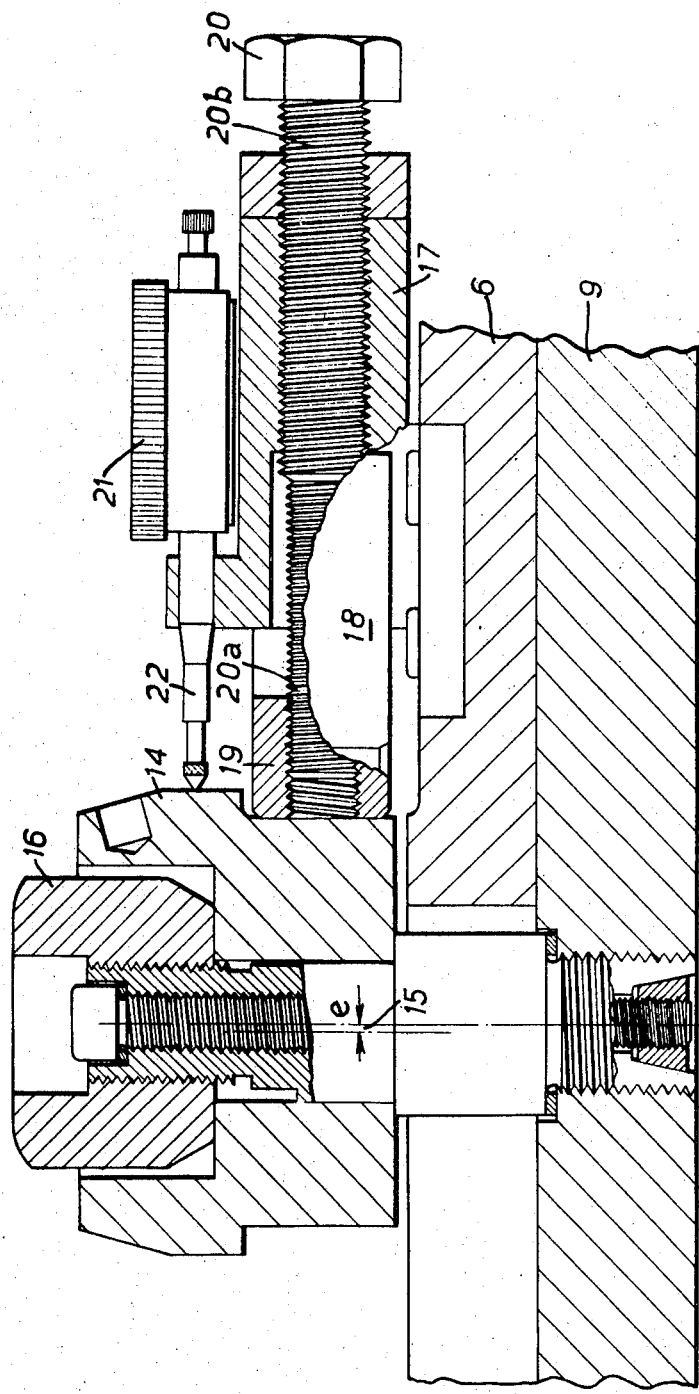
FIG. 2 is an enlarged section, taken at right angles thereto, along the line II—II of FIG. 1.

The machine for granulating thermoplastics includes a cutter head 1, having cutters 2, which are movable past a nozzle plate 3 with a predetermined clearance and serve to granulate material being extruded from passages 4.

The cutter head 1 is driven by a spindle 5.

The material thereby granulated collects in the casing 6 and, together with water from a supply connection 7, is delivered through an opening 8.

The cutter head spindle 5 is surrounded by an axially movable bush 9, which transmits this movement to the spindle 5. Thus, for example, if the bush 9 be moved to the right in the drawing, the cutter head spindle 5 and hence also the cutter head 1 will likewise move to the right at the same time, thereby reducing the clearance between the cutters 2 and the nozzle plate 3.

The bush 9 is connected by a pin 10, and a clevis 11, 12 to a piston and cylinder 13 operated by fluid under pressure, which exerts a continuous thrusts on the bush 9.

The pressure cylinder 13 is anchored to that part of the casing 6 which lies on the left in the drawing.

Connected to the bush 9 is a stop 14, in the form of an eccentric, which can be adjusted about, and locked in relation to, the vertical axis, its eccentricity being indicated by the letter $e$. This stop has freedom to rotate about the pin 15 and is locked in place by the nut 16. When the degree of eccentricity $e$ is 2 mm., for example, a 4 mm. axial displacement of the bush 9 and hence also of the cutter head spindle 5 and cutter head 1 is possible.

An internally-threaded bush 17 is secured to the casing 6 by means (not shown) and forms part of a differential screw adjustment device. The device also includes a bearing 18 incorporating a counter-stop 19 fitted in such a way as to be capable of axial movement while being prevented from rotational movement. One part, 20$a$, of the screw 20 engages in this counter-stop 19, while the other part 20$b$, of the screw 20 is screwed into the threaded bush 17. Whereas, in the example shown in the drawing, the pitch of the thread in the part 20$b$ is 2 mm. for instance, that of the thread in the part 20$a$ is only 1.5 mm.

The fine adjustment of the proposed device works as follows:

Should it be desired, for example, to increase the clearance between the cutters 2 and the nozzle plate 3, the screw 20 will be turned through one revolution clockwise. In this instance, therefore, the screw 20 will move 2 mm. to the left in the drawing. The part 20$a$ of the screw will carry out the same axial movement, but, because of the smaller pitch of its thread, will retract the counter-stop 19 by only 1.5mm., that is to say, in relation to the drawing, towards the right, so that a net advance of the stop 19 amounting to no more than 0.5mm. has been achieved. The 0.5mm. leftward displacement of the counter-stop 19 is communicated via the stop 14 to the bush 6 and hence also to the cutter head spindle 5 and the cutter head 1 itself, thus increasing the clearance to the same extent. The thrust being exerted all the time by the piston and cylinder 13 on the bush 9 and hence also on the two stops 14 and 19 completely eliminates the play in the threads of the differential screw adjustment device. Thus a complete absence of lost motion is achieved, which is extremely important for precision in adjustment.

To enable the exact amount of adjustment to be monitored at any moment, a dial gauge is provided at 21, with its feeler 22, in contact with the stop 14.

I claim:

1. In a machine for granulating thermoplastics material comprising
    a cutter head,
    a nozzle plate spaced from the cutter head by a small adjustable clearance,
    means for extruding thermoplastics material through the nozzles of the nozzle plate,
    a spindle carrying the cutter head, and
    a bush surrounding at least a part of said spindle, the improvement comprising
    means defining a stop mounted on said bush,
    means defining a differential screw adjustement device,
    a counter-stop co-operating with the screw adjustment device and in abutting relationship with the said stop, and
    means acting continuously on the stop and counter-stop whereby any free-play in the threads of the differential screw thread adjustment device is eliminated.

2. A machine according to claim 1, wherein the stop is in the form of an eccentric that can be adjusted and locked.

3. A machine according to claim 2, wherein the stop is rotatable about an axis at right angles to the spindle of the cutter head.

4. A machine according to claim 1, wherein the counter-stop is so mounted as to be capable of axial movement, but not of rotation.

5. A machine according to claim 1, wherein the differential adjusting device comprises a fixed screw-threaded bush and the screw thereof comprises a first part which screws in said bush and a second part which engages the counterstop.

6. A machine according to claim 5, in which the threads on the two parts of the screw differ in pitch.

7. A machine according to claim 5, comprising a dial gauge for monitoring the fine adjustment.

8. A machine according to claim 7, in which the dial gauge lies in contact with the stop.

9. A device according to claim 1, wherein said means continuously acting on the stop and counter-stop comprises a piston and cylinder operated by a fluid under pressure.

* * * * *